M. N. CARLISLE.
PLANTER.
APPLICATION FILED SEPT. 20, 1919.

1,347,441.

Patented July 20, 1920.
2 SHEETS—SHEET 1.

Witnesses
R. A. Thomas

Inventor
M. N. Carlisle
By Victor J. Evans

M. N. CARLISLE.
PLANTER.
APPLICATION FILED SEPT. 20, 1919.
1,347,441.
Patented July 20, 1920.
2 SHEETS—SHEET 2.
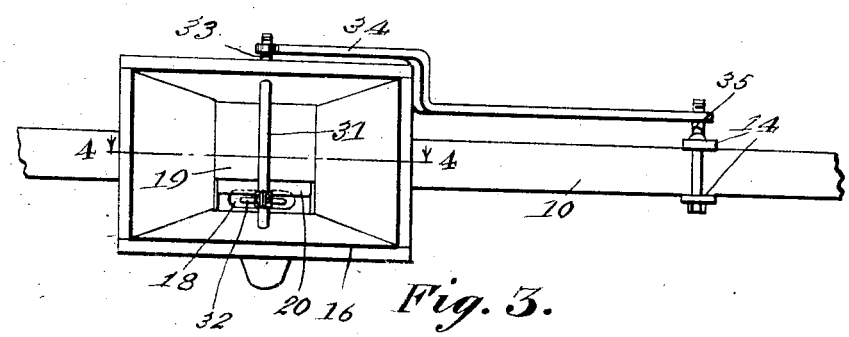
Fig. 3.
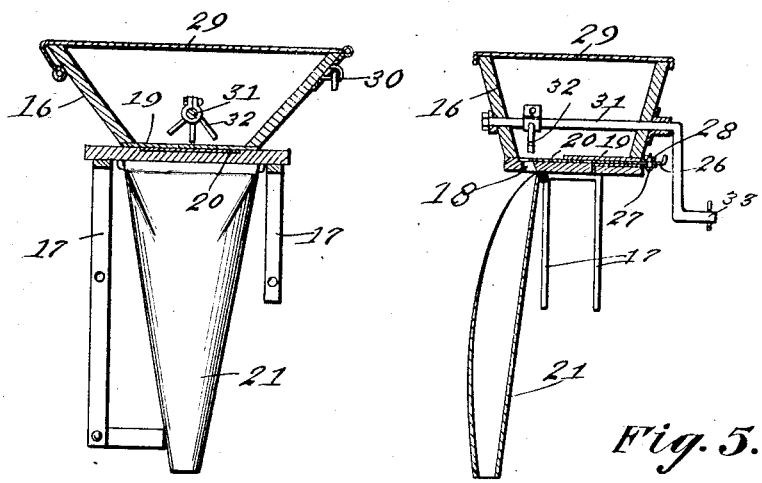
Fig. 4.
Fig. 5.
Witnesses
R. A. Thomas
Inventor
M. N. Carlisle
By Victor J. Evans

UNITED STATES PATENT OFFICE.

MARION N. CARLISLE, OF APPLEBY, TEXAS.

PLANTER.

1,347,441.   Specification of Letters Patent.   Patented July 20, 1920.

Application filed September 20, 1919. Serial No. 325,054.

*To all whom it may concern:*

Be it known that I, MARION N. CARLISLE, a citizen of the United States, residing at Appleby, in the county of Nacogdoches and State of Texas, have invented new and useful Improvements in Planters, of which the following is a specification.

The object of the invention is to provide a seeder attachment for plows whereby an ordinary one or two horse plow can be readily converted into a planter adapted for planting grains of all kind, including wheat, oats, rye, barley, sorghum and other seed of the sorghum family as well as peas, beans and the like, means being provided in connection therewith for the adjustment of the parts to adapt the mechanism to plant at different intervals between rows and at greater or less rapidity according to the character of the seed and the soil it being possible to cover each row as it is planted by employing a covering shovel in connection with the plow standards.

With these and other objects in view the invention consists in a construction, combination and arrangement of parts illustrated in the accompanying drawings, it being understood that changes in form, proportion and details may be resorted to within the scope of the claims without departing from the principles involved.

In the drawings:

Fig. 3 is a plan view of the same, the cover of the seed box being omitted.

Fig. 4 is a longitudinal section through the seed box.

Fig. 5 is a transverse section of the same.

Figure 1:
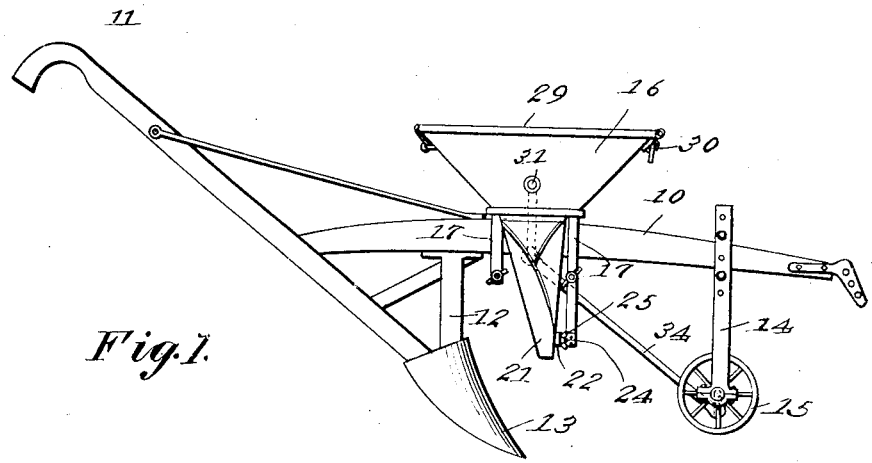
Figures 1 and 2 are side views, showing opposite sides respectively, of a planter mechanism mounted upon an ordinary plow beam.
Figure 2:
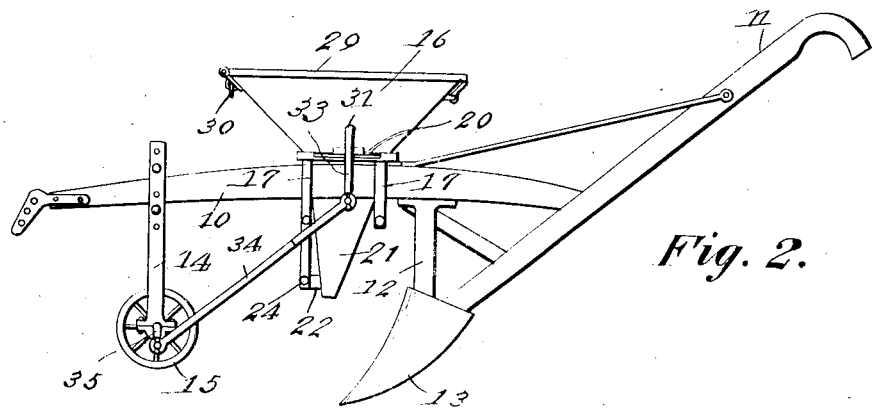
Figure 6:
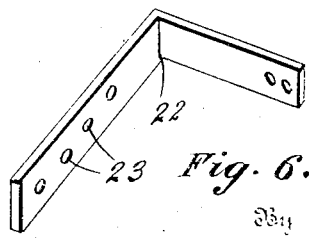
Fig. 6 is a perspective view of the bracket for holding the discharge chute.

The plow beam 10 may be of the ordinary form used in single and double team plows having the handles 11 and the plow stop or standard 12 to which may be attached a covering shovel 13. Secured to the beam by means of hanger brackets 14 is a ground or pilot wheel 15 while mounted upon the beam in rear thereof, but preferably in advance of the plow stop or standard is a seed box 16 held in place by the clamps 17. In the bottom of the seed box is formed a V-shaped discharge opening 18 adjacent to which is a guide 19 for the reception of the lateral edges of a seed slide 20 capable of movement transversely of the seed box to expose more or less of the discharge opening in the bottom of the box, so as to control the rapidity with which the seed or grain is fed from the seed box to the seed tube or chute 21. This seed tube or chute extends under the discharge opening of the seed box so as to receive the seed or grain therefrom, and conduct it to a point of discharge sufficiently close to the surface of the ground to insure the proper deposit thereof in furrows provided for the purpose, the discharge end of said chute being movable toward and from the vertical plane of the beam, so as to vary the interval between the plane of said discharge end and that of the covering or furrow opening plow used on the beam, the required position of said discharge end of the chute being secured by a bracket 22 projecting from the side of the beam and having a plurality of openings 23 for the reception of a fastening bolt 24 fitted with a thumb nut 25.

The regulating slide by which the opening in the bottom of the seed box is controlled is provided with a slot 26 engaged by a bolt 27 fitted with a thumb nut 28 so that said slide may be secured at the desired adjustment.

The seed box is preferably provided with a hinged cover 29 which may be secured in its closed position by any suitable locking means indicated at 30, and mounted transversely in the seed box is a rocker shaft 31 carrying the agitator blade 32 and having a crank arm 33 connected by a pitman 34 with a crank 35 on the axle of the ground or pilot wheel, so that as the device progresses along the road, motion is communicated from the ground wheel through the pitman to the rocker shaft to cause the agitator to loosen the seed or grain in the box and insure its regular feed through the opening to the chute for deposit in the furrow.

It is obvious that the feeding mechanism consisting of the box with its attachment and the means for communicating motion to the rocker shaft thereof may be applied as an attachment to an ordinary plow beam or may be formed as elements of a planter as originally constructed, and by its use a series of furrows may be formed and successively planted and covered in a single operation to thus save time and facilitate the efforts of the farmer in cultivating tracts of large acreage.

Having described the invention what is claimed is:—

1. A planter having a beam, a seed box mounted thereon and provided in its bottom with a V shaped outlet opening, an adjustable slide disposed in operative relation with said opening to regulate the outlet for the contents of the box, agitating means for the contents of the box, operating devices for said agitating means, and a seed chute in communication at its upper end with the outlet of the seed box, and adjustable at its outlet end toward and from the vertical plane of the beam for determining the interval between rows.

2. A planter having a beam carrying a stop or standard for a covering shovel, a seed box provided with an outlet, an adjustable slide for regulating the opening of the outlet, an agitator having a rock shaft mounted in the seed box, a ground or pilot wheel operatively connected with said rock shaft for imparting agitating movement thereto, a seed chute in communication at its upper end with said seed box outlet, and movable at its lower end toward and from the vertical plane of the beam, a bracket carried by the beam for supporting the outlet end of the seed chute, and means for adjustably connecting the outlet end of the seed chute to said bracket to regulate the distance between said outlet and the vertical plane of the plow beam.

In testimony whereof I affix my signature.

MARION N. CARLISLE.